US008276847B2

(12) United States Patent
Mänz

(10) Patent No.: US 8,276,847 B2
(45) Date of Patent: Oct. 2, 2012

(54) COVER FOR AN AIRCRAFT STRUCTURE

(75) Inventor: Christian Mänz, Hemburg (DE)

(73) Assignee: Airbus Operations GmbH (DE)

( * ) Notice: Subject to any disclaimer, the term of this patent is extended or adjusted under 35 U.S.C. 154(b) by 444 days.

(21) Appl. No.: 12/592,006

(22) Filed: Nov. 18, 2009

(65) Prior Publication Data

US 2010/0148007 A1    Jun. 17, 2010

Related U.S. Application Data

(63) Continuation-in-part of application No. 11/581,543, filed on Oct. 16, 2006, now abandoned, which is a continuation of application No. PCT/EP2005/004097, filed on Apr. 18, 2005.

(60) Provisional application No. 60/598,256, filed on Aug. 3, 2004.

(30) Foreign Application Priority Data

Apr. 16, 2004    (DE) .......................... 10 2004 018 579

(51) Int. Cl.
*B64C 3/18* (2006.01)
*B64C 1/06* (2006.01)

(52) U.S. Cl. ...................... 244/123.1; 244/87

(58) Field of Classification Search .............. 244/117 R, 244/119, 120, 123.1, 131, 132, 87
See application file for complete search history.

(56) References Cited

U.S. PATENT DOCUMENTS

| 1,939,599 A | 12/1933 | Ragsdale |
| 2,367,750 A | 1/1945 | Berkow et al. |
| 2,390,761 A | 12/1945 | Watter |
| 2,407,614 A | 9/1946 | Montgomery et al. |
| 2,427,853 A | 9/1947 | Goodlett |
| 2,567,124 A | 9/1951 | Roberts |
| 2,742,247 A | 4/1956 | Lachmann |
| 3,976,269 A | 8/1976 | Gupta |
| 4,148,450 A | 4/1979 | Neuhierl et al. |
| 4,171,785 A | 10/1979 | Isenberg |
| 4,356,616 A | 11/1982 | Scott |
| 4,481,703 A | 11/1984 | Scott |
| 4,739,954 A | 4/1988 | Hamilton |
| 5,242,523 A | 9/1993 | Willden et al. |
| 5,501,414 A | 3/1996 | Bauer et al. |
| 5,586,391 A | 12/1996 | Micale |

(Continued)

FOREIGN PATENT DOCUMENTS

DE    100 05 348 A1    8/2001

(Continued)

OTHER PUBLICATIONS

"The Henschel Hs 126 reconnaissance Monoplane" The Aeroplane, p. 667, Nov. 30, 1939.

(Continued)

*Primary Examiner* — Joseph W Sanderson
(74) *Attorney, Agent, or Firm* — Lerner, David, Littenberg, Krumholz & Mentlik, LLP

(57) ABSTRACT

A cover for an aircraft structure, in particular for nose parts of the vertical tail, horizontal tail or the wing, including a skin and support structure. The skin is arranged on the support structure and the support structure includes a plurality of ribs and a plurality of stringers. The plurality of stringers are arranged on the plurality of ribs to support the skin. Also provided is an aircraft having such a cover.

15 Claims, 10 Drawing Sheets

U.S. PATENT DOCUMENTS

| | | |
|---|---|---|
| 5,744,197 A | 4/1998 | Van Eck |
| 5,806,797 A | 9/1998 | Micale |
| 6,314,630 B1 | 11/2001 | Munk et al. |
| 6,364,250 B1 | 4/2002 | Brinck et al. |
| 6,415,510 B2 | 7/2002 | Mertens et al. |
| 6,595,467 B2 | 7/2003 | Schmidt et al. |
| 6,648,273 B2 | 11/2003 | Anast |
| 6,684,593 B2 | 2/2004 | Brenneis et al. |
| 6,712,315 B2 | 3/2004 | Schmidt et al. |
| 6,766,984 B1 | 7/2004 | Ochoa |
| 6,776,371 B2 | 8/2004 | Tanaka et al. |
| 6,786,452 B2 | 9/2004 | Yamashita et al. |
| 7,025,305 B2 | 4/2006 | Folkesson et al. |
| 7,074,474 B2 | 7/2006 | Toi et al. |
| 7,159,822 B2 | 1/2007 | Grantham et al. |
| 2001/0013173 A1 | 8/2001 | Mertens et al. |
| 2004/0035979 A1 | 2/2004 | McCoskey et al. |

FOREIGN PATENT DOCUMENTS

| | | |
|---|---|---|
| EP | 0 995 673 A2 | 4/2000 |
| EP | 1 127 785 A2 | 8/2001 |
| EP | 1 176 089 A2 | 1/2002 |
| JP | 2002053098 A | 2/2002 |
| WO | 02/098733 A1 | 12/2002 |
| WO | 03/000546 A2 | 1/2003 |

OTHER PUBLICATIONS

L'Aeronautique, No. 223, p. 294, Dec. 1937.

COVER FOR AN AIRCRAFT STRUCTURE

REFERENCE TO RELATED APPLICATIONS

This application is a continuation in part of U.S. Application Ser. No. 11/581 543 filed Apr. 18, 2005 and claims the benefit of the filing date of German Patent Application No. 10 2004 018 579 filed Apr. 16, 2004 and of U.S. Provisional Patent Application No. 60/598,256 filed Aug. 3, 2004, the disclosure of which applications is hereby incorporated herein by reference.

FIELD OF THE INVENTION

The present invention relates to a fairing or cover for an aircraft structure, in particular for the formation of nose parts of vertical and horizontal tails and wings. In particular, the present invention relates to a cover for an aircraft structure and to an aircraft with a corresponding fairing.

TECHNOLOGICAL BACKGROUND

In aircraft, nose parts of the fairing of vertical tails and horizontal tails as well as of wings are exposed to the danger of impact by objects, for example bird strike. In any case, these fairings must ensure that the support structure of the aircraft, which support structure is located below said fairing, is fully protected against damage as a result, for example, of such a bird strike. At present, this is achieved by carbon-fibre reinforced plastic (CFP) sandwich constructions or aluminium constructions. Corresponding metal constructions usually comprise sheet metal that has been drawn in an aerodynamic form and that has been stiffened by ribs.

In a disadvantageous manner, a large number of ribs and relatively thick sheet metal have usually to be provided in order to, for example, avoid crack formation in the sheet metal which, for example, forms the skin of the aircraft. Consequently, such metal constructions are heavy.

Known CFP constructions require expensive erosion protection paint or correspondingly expensive corrosion protection.

SUMMARY OF THE INVENTION

It is an object of the present invention to state a light-weight and economical cover of fairing for an aircraft structure.

According to an exemplary embodiment of the present invention a cover or fairing for an aircraft structure is provided, which cover can in particular be used for nose parts of vertical and horizontal tails or wings. The cover comprises a skin and a support structure. The skin is arranged on the support structure. The support structure comprises a plurality of ribs and a plurality of stringers. The plurality of stringers are arranged on the plurality of ribs to support the skin.

Advantageously, this exemplary embodiment of the present invention makes it possible to distribute the impact energy, for example from a bird strike, to a larger region. In other words the stringers that are arranged underneath the skin deflect the impact energy to a larger region, as a result of which the energy introduced following the bird strike is distributed to a larger area as a result of plastic deformation of the skin, the stringers and the ribs. In this context the term "large area" refers to the area that is deformed by the impacted object being larger, preferably significantly larger, than the dimensions of the impacted object.

In contrast to prior art, discussed above, in the case of the present invention the energy that has been introduced, for example by a bird strike, is distributed, by the stringers, to a large region of the cover, as a result of which, for example, a thinner skin and a significantly reduced number of ribs can be provided so that the weight of the cover can be reduced.

According to a further exemplary embodiment of the present invention the skin forms a curvature around the structure of the aircraft. The form of the plurality of ribs is fastened at least to a cross section of the curvature, and the plurality of stringers essentially extend parallel to each other on the plurality of ribs. As a result of the parallel arrangement of the stringers at defined spacing, a situation can be achieved in which at a defined size of the impacting object a defined number of stringers undergo plastic deformation along a considerable length, thus absorbing a large part of the introduced energy. Only a small part of the introduced energy is absorbed by plastic deformation of the sheet metal, which is in contrast to prior art as discussed above where the aircraft skin as a result of deformation absorbs a significant part of the energy introduced.

According to a further exemplary embodiment of the present invention the skin, the plurality of stringers and the plurality of ribs are designed, i.e. arranged such that the impact energy is deflected to a region that is significantly larger than the dimensions of the impacting object. This embodiment essentially relates to a thickness and a material of the skin, to dimensions and spacing of the stringers, as well as to dimensions of the ribs. In particular this also relates to the spacing of the arranged ribs, which spacing can be significantly increased when compared to the spacing in prior art as discussed above. For example in the case of various structures the spacing between the ribs can be doubled, trebled or even quadrupled, as a result of which, overall, the weight of the cover can be reduced, i.e. kept low.

According to a further exemplary embodiment of the present invention the skin forms a nose part of the vertical tail, horizontal tail or of wings of the aircraft. The nose part then comprises an edge, for example the tail unit edge or wing edge, which extends essentially in one direction. The plurality of ribs are essentially arranged at right angles to this direction, and the plurality of stringers are arranged essentially parallel to the direction. For example by a parallel arrangement of the plurality of stringers parallel to the tail unit edge or wing edge, in this way it is possible, if an object impacts, to deflect deformation to regions that are arranged along this direction. In other words, transfer of the impact energy or deformation along the tail unit edge or wing edge is achieved, wherein deformation into the tail unit or into the wing, i.e. at a right angle to the direction, can be kept relatively small, so that good protection of the aircraft structure can be achieved.

According to another advantageous exemplary embodiment of the present invention the plurality of stringers are connected to the skin. For example, stringer installation can be carried out by means of a laser welding process.

According to a further advantageous exemplary embodiment of the present invention in contact regions where the plurality of stringers touch the skin or are connected to the skin, the skin comprises thickened parts or regions. This makes in possible in an advantageous manner to design the aircraft's skin so that it is even thinner, because certain minimum thicknesses of the skin, which are for example necessary for welding of the stringers to the skin, are only required in the immediate surroundings of the welding regions rather than having to extend over the entire region of the skin.

According to a further exemplary embodiment of the present invention the stringers may have a T-, L-, Z-, U- or J-shaped cross section, which makes possible a simple and structurally stable design and arrangement of the stringers.

According to a further advantageous exemplary embodiment of the present invention each of the plurality of stringers comprises a stringer base that is designed to contact the skin. The stringer base can comprise recesses. These recesses can, for example for further weight reduction, be evenly distributed over all the stringers, but also be distributed so as to be accumulated in regions where less stability of the stringers is required. In this way it is, for example, possible to achieve a further reduction in weight.

According to a further advantageous exemplary embodiment of the present invention the recesses, which are for example designed as cut-outs, towards the skin comprise an opening that opens towards the skin of the aircraft. These recesses can then advantageously serve as expansion compensation regions in the case of deformation that is caused by an object impacting the skin. In this manner compression forces or expansion forces that occur in the case of such an impact can be controlled.

According to a further advantageous exemplary embodiment of the present invention each of the plurality of stringers comprise a stringer base that is designed to contact the skin, wherein the stringers may comprise weakened areas that may be positioned on the side of the stringers being opposite to the skin. These weakened areas are preferably designed such that an impact on the stringer leads to bending the stringer at the weakened areas wherein those parts of the stringer between two adjacent weakened areas substantially remain undeformed. Thereby a link chain is created that leads to spreading the impact energy into a larger skin area thus improving the impact energy absorption.

In a still further advantageous exemplary embodiment of the present invention the weakened areas are realized as recesses positioned opposite to the stringer base and extending in the direction of the stringer base. Preferably, the recesses do not reach the stringer base. Thereby, by a force acting on the stringer base the weakened area expands and leads to a buckling of the stringer in this area, which buckling leads to pulling the parts of the stringer being adjacent to the weakened area towards the impact area, thus leading to buckling of the adjacent weakened areas and so on. Thereby the skin attached to the stringer base deforms and absorbs the impact energy.

In an advantageous exemplary embodiment of the present invention at least one recess is realized as a slot extending from the stringer side opposite to the stringer base into an inner area of the stringer. It is beneficial to use such a slot since only deformations are permitted that are directed to the inside of the cover according to the present invention. A deformation towards an outer area of the cover is almost impossible since the adjacent flanks of the slot will touch and prohibit a further deformation into this direction. The aim to increase the deformed area is achieved by this measure. Furthermore, this kind of weakened area is easy to manufacture.

Also, in a further advantageous exemplary embodiment of the present invention at least one recess is realized as an at least partially triangular or trapezoidal recess extending from a side of the stringer opposite to the stringer base into an inner area of the stringer.

Further, in an advantageous exemplary embodiment of the present invention at least one recess is realized as an opening positioned in an inner area of the stringer, neither reaching the stringer base nor the opposite side. Thus, a predetermined breaking point is created in an area between the opening and the side opposite to the stringer base. By acting of an impact force the stringer side opposite to the stringer base expands until the predetermined breaking point breaks. Thereby, a fraction of the impact energy is absorbed. Further, by breaking a predetermined breaking point the stringer is converted into a link chain which leads to pulling stringer parts adjacent to the weakened areas towards the impact area, thus breaking of adjacent predetermined breaking points, thereby deforming the skin attached to the stringer base and thereby spreading the impact energy on a larger area.

According to a still further exemplary embodiment of the present invention each of the plurality of stringers comprises weakened areas, wherein the weakened areas of adjacent stringers are positioned in a staggered arrangement. Thereby a deformation of the skin in a direction not parallel to the stringers is achieved, thus leading to a greater deformation of the skin attached to the stringer bases and an improved impact energy absorption. The link chains of the plurality of stringer parts with weakened areas together act as a web like structure wherein the web nodes are built by the weakened areas and wherein the web nodes may only be displaced by a certain displacement force leading to impact energy absorption. The skin attached to the stringers fold or stagger in a way that the edges of rectangular sections on an undeformed skin become oblique, crooked or skewed.

According to a still further exemplary embodiment of the present invention the cover is a self-supporting structure being sufficiently stiff for providing a given shape under influence of the aerodynamic forces on the aircraft. Thus it may not be needed to include a plurality of ribs between a pair of outer ribs defining the shape of the cover according to the present invention and the additional weight of the stringers can be compensated by removing a plurality of ribs accordingly.

According to a further exemplary embodiment of the present invention the support structure and the skin are designed or arranged such that, when a spherical body impacts the skin, deformation of the skin occurs that does not have a rotationally symmetrical cross section. This means for example that a direction of the greatest deformation of the skin can advantageously be set by the direction and design of the stringers underneath the skin, and in this manner, for example, deformation can be designed such that regions where a support structure is arranged just under the surface of the skin deform only a little and that the essential deformation energy is transferred to other regions.

According to a further advantageous exemplary embodiment of the present invention the skin is made of sheet metal, for example of aluminium sheet metal.

Claim 16 of the present invention relates to an aircraft with a fairing as described in claims 1 to 15.

SHORT DESCRIPTION OF THE DRAWING

Below, exemplary embodiments of the present invention are described in more detail with reference to the following figures.

Figure 7A:
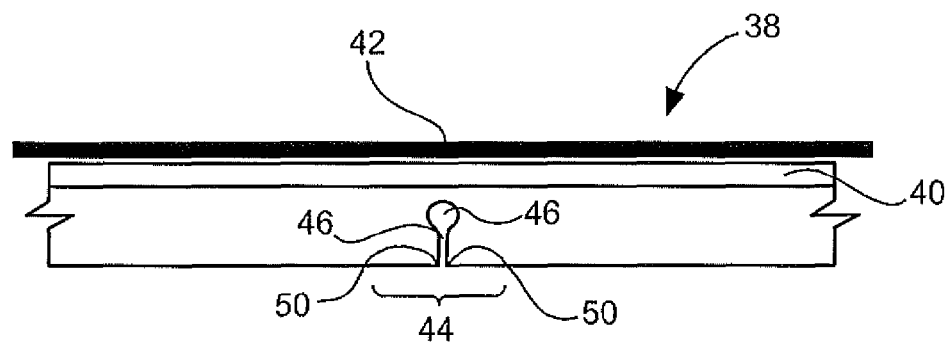
Figure 7B:
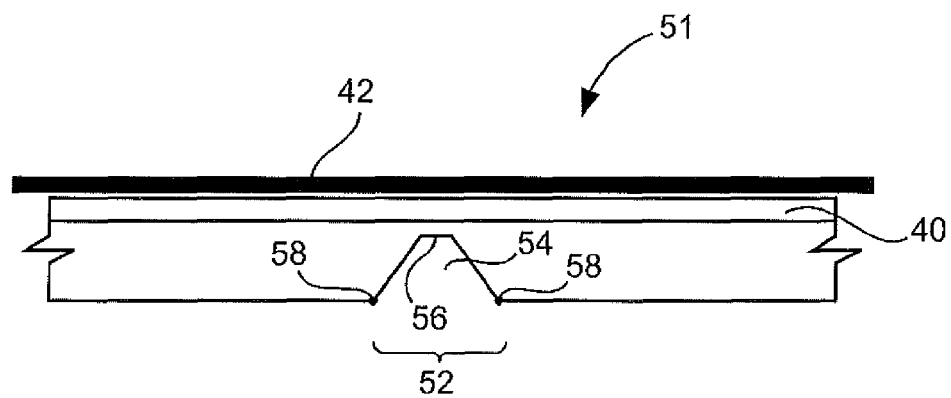
Figure 7C:
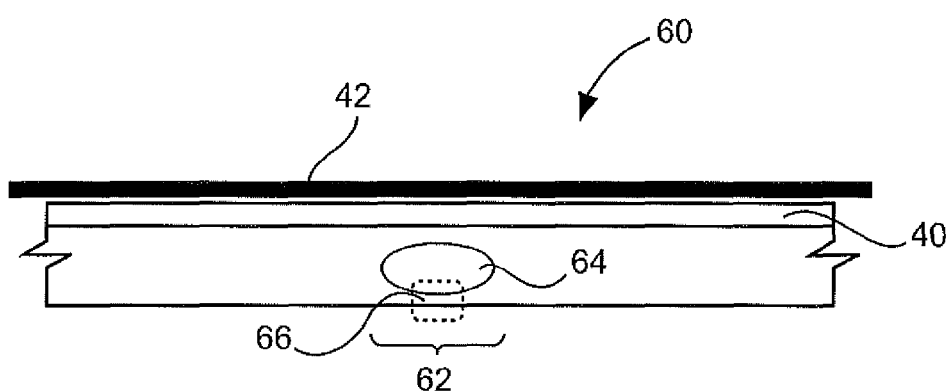

FIGS. 7a, 7b and 7c each show a section of a stringer each with a weakened area supporting the build up of a link chain.

Figure 8:
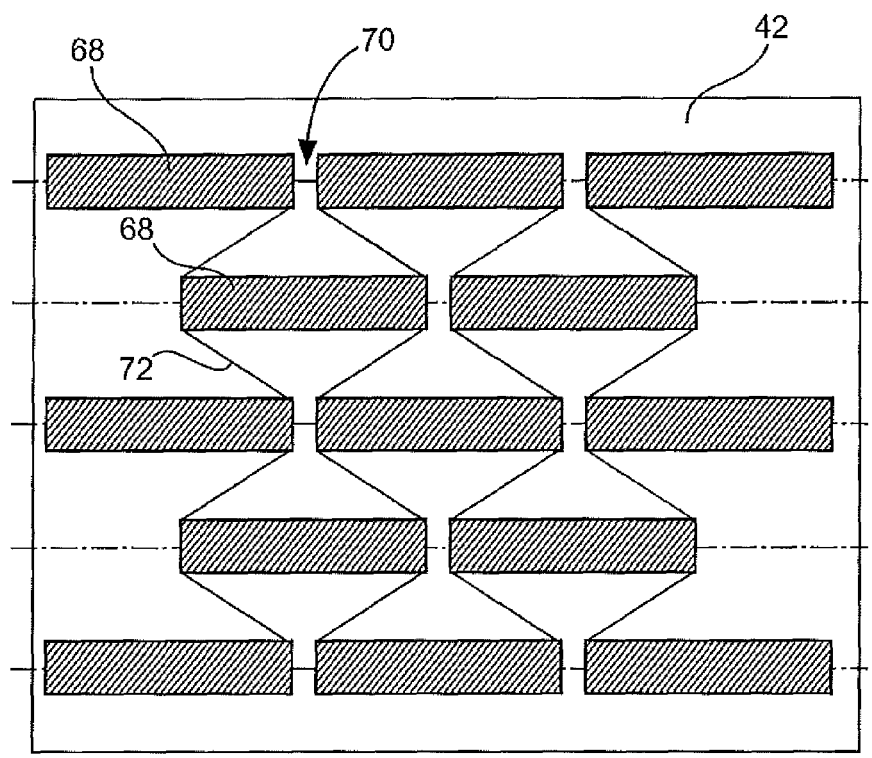

FIG. 8 shows an unwind of an inside of a cover according to the present invention.

Figure 9:
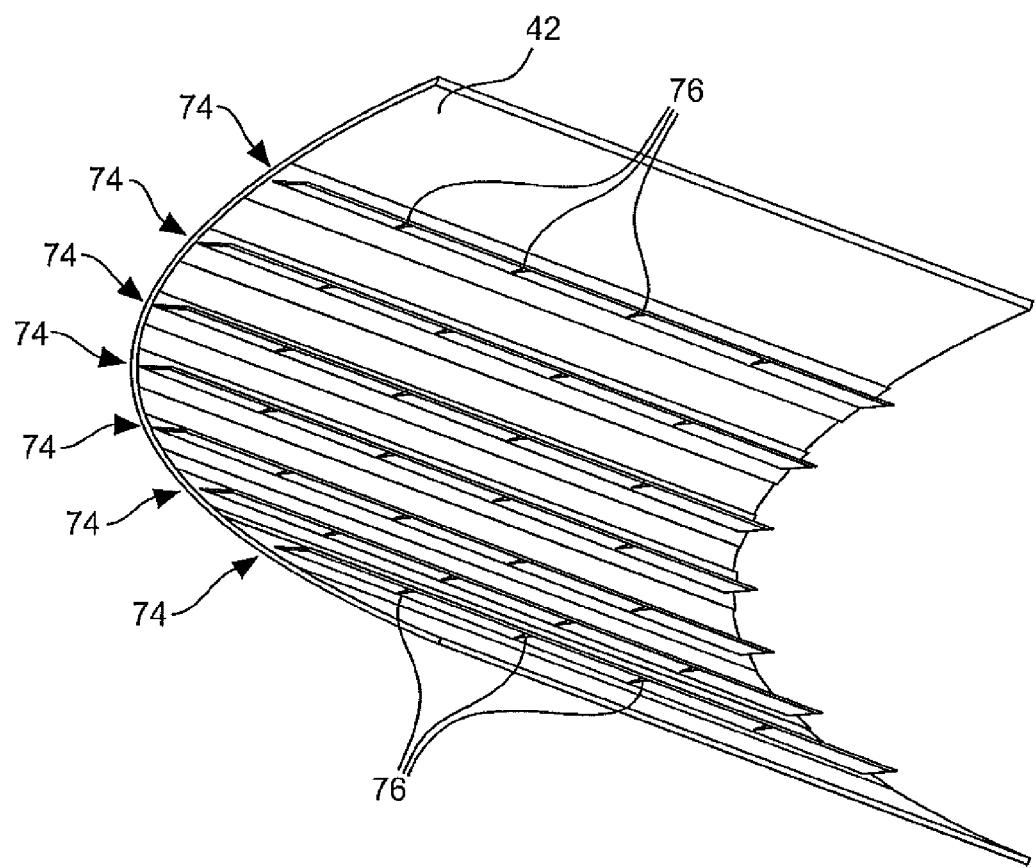

FIG. 9 shows an inside of a cover according to the present invention.

Figure 10:
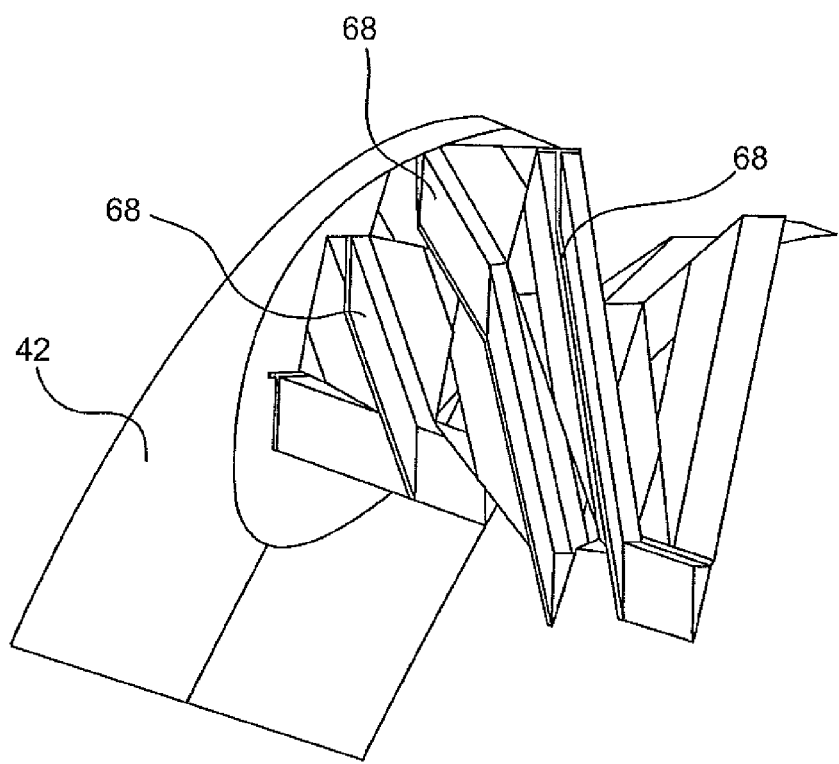

FIG. 10 shows a deformed cover in a schematical three dimensional view.

Figure 11:
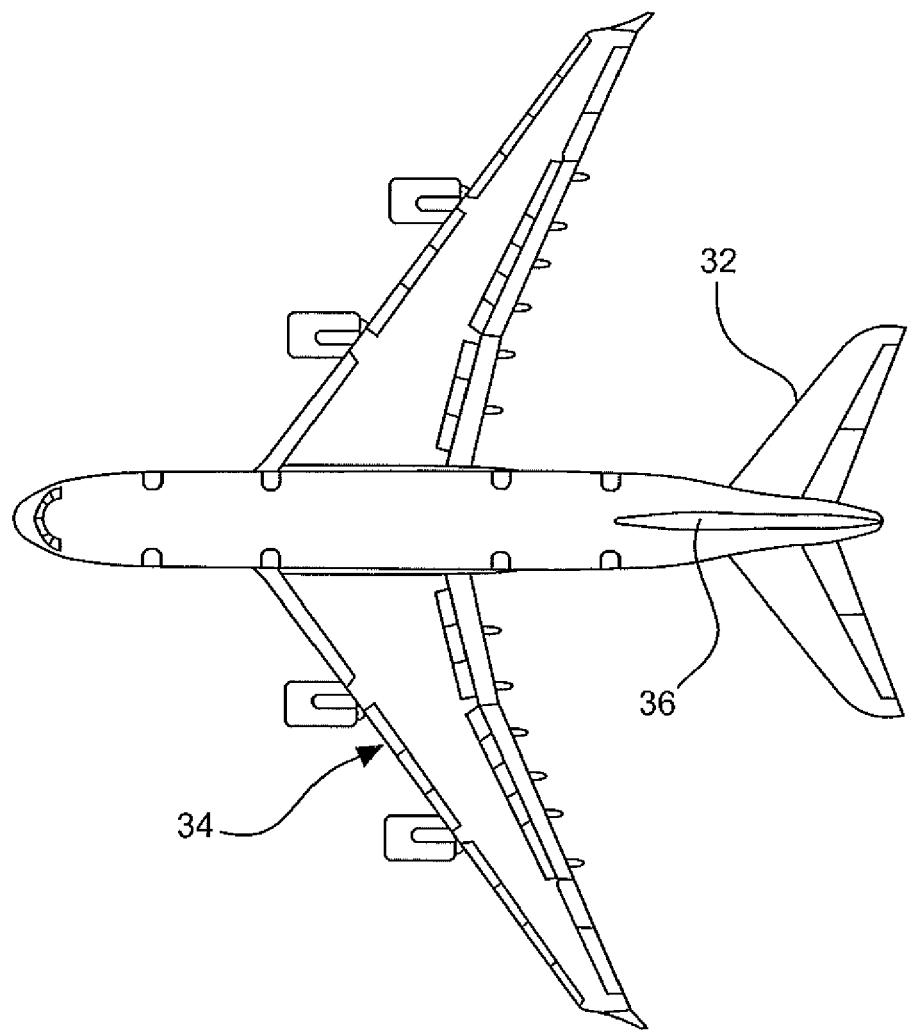

FIG. 11 shows an aircraft with an exemplary embodiment of the fairing according to the present invention.

DETAILED DESCRIPTION OF EXEMPLARY EMBODIMENT

In the following description of FIGS. 1 to 10 the same reference characters are used for identical or corresponding elements.

Figure 1:
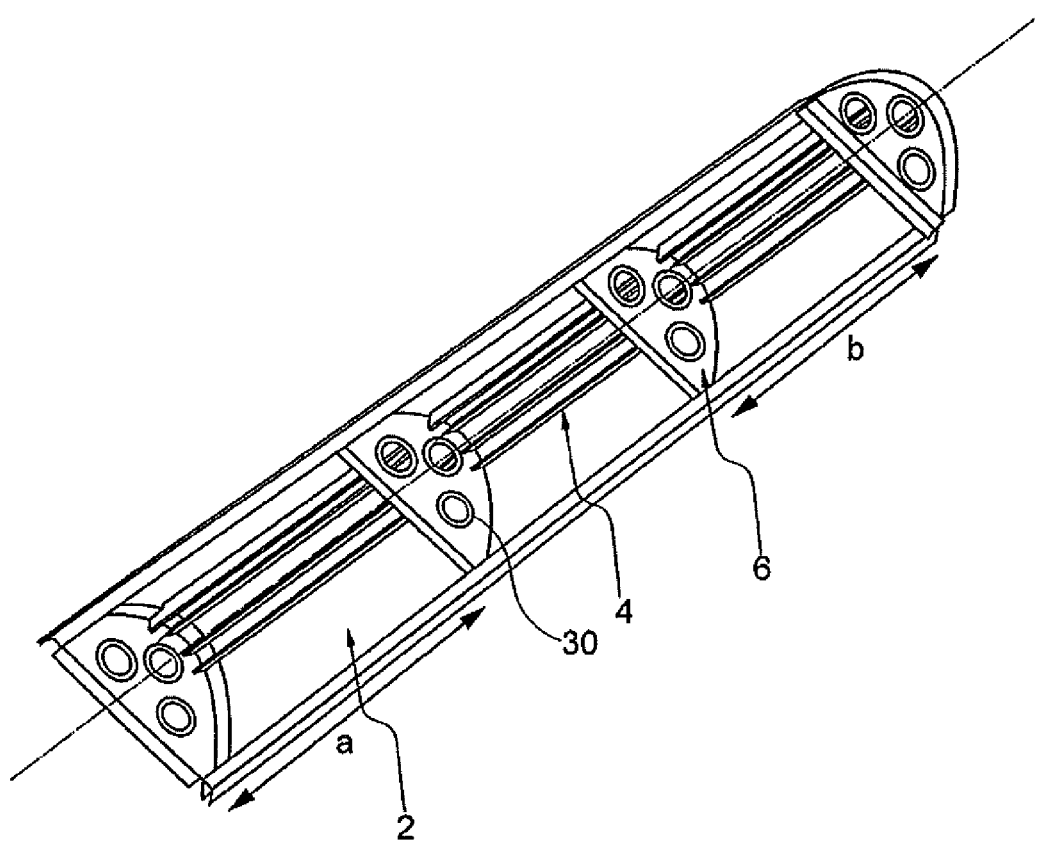
FIG. 1 shows a three-dimensional diagram of a fairing according to a first exemplary embodiment of the present invention.

FIG. 1 shows a three-dimensional view of a cover according to an exemplary embodiment of the present invention. The fairing shown in FIG. 1 can, for example, be a nose part of a vertical tail, of a horizontal tail or of a wing of the aircraft. As shown in FIG. 1, a skin 2 is bent such that it forms a certain radius, which, for example, forms the nose part of an aircraft's tail unit or wing or tail unit edge or wing edge. The nose part essentially extends along a direction indicated in the diagram by a dot-dash line. Below the skin, essentially in the region of the tail unit edge or wing edge or the back of the nose part, a plurality of stringers 4 are arranged essentially parallel in relation to the direction of extension of the fairing. In order to prevent deformation of the skin by air loads, at large distances small ribs 6 are arranged. The ribs can, for example, comprise holes 30 so as to save weight. Furthermore, it is possible, for example, to use crescent-shaped or boomerang-shaped ribs 6. The ribs can be arranged at an equidistant spacing a or b. However, it is also possible, as shown in FIG. 1, to vary the spacing between the ribs, for example such that two ribs are arranged at a spacing a, while two further ribs are arranged at a spacing b. The spacing between the ribs can be varied in accordance with the loads that will occur.

In contrast to the state of the art discussed above, where for example in the case of a bird strike the introduced energy is not adequately distributed or essentially converted to deformation of the skin and thus a substantial material thickness of the skin or of the arranged ribs is necessary, according to this exemplary embodiment, as a result of plastic deformation of the stringers, said energy is absorbed along a substantial length, as a result of which the stringers absorb the largest part of the introduced energy. Only a small part of the introduced energy is absorbed by plastic deformation of the skin or of the sheet metal of the skin. The precise course of deformation can be variably matched by the frequency of the ribs, by the dimensions and arrangement of the stringers, as well as by the material, the thickness or the design of the skin. In this way, the structure of the fairing can be matched by simulation such that desired deformation is achieved.

For example, the stringers 4 can be affixed to the skin 2 by means of a laser welding process, as a result of which a simple and economical production process can be stated.

Figure 2A:
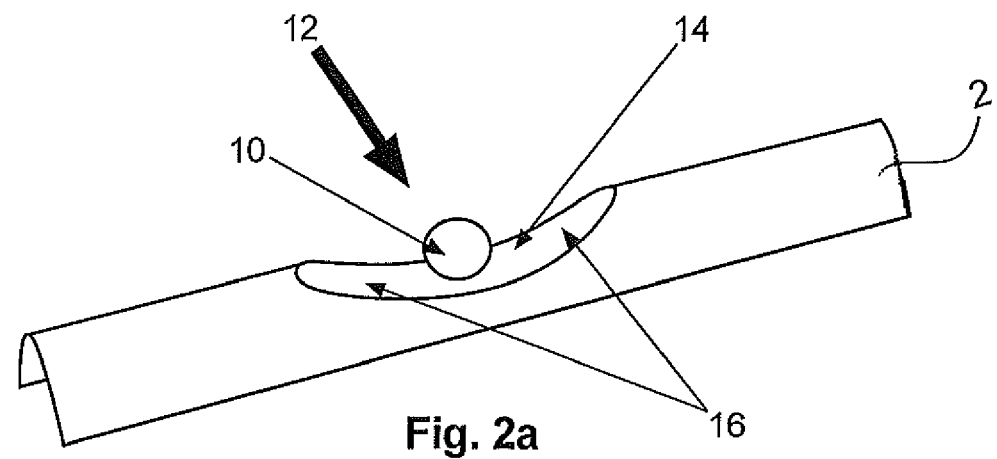
FIGS. 2a to 2c show deformation due to the impact of a spherical body on the fairing of FIG. 1.
Figure 2B:
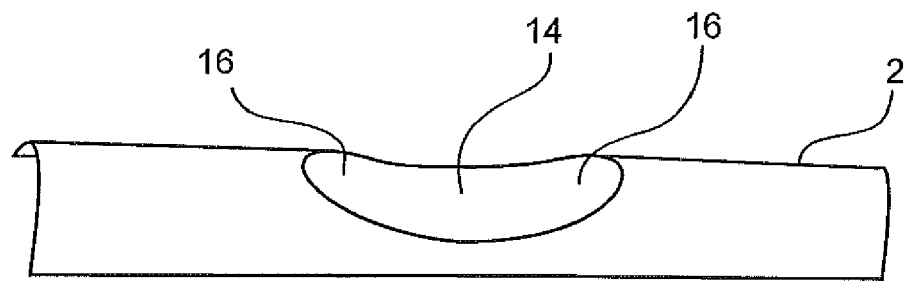
Figure 2C:
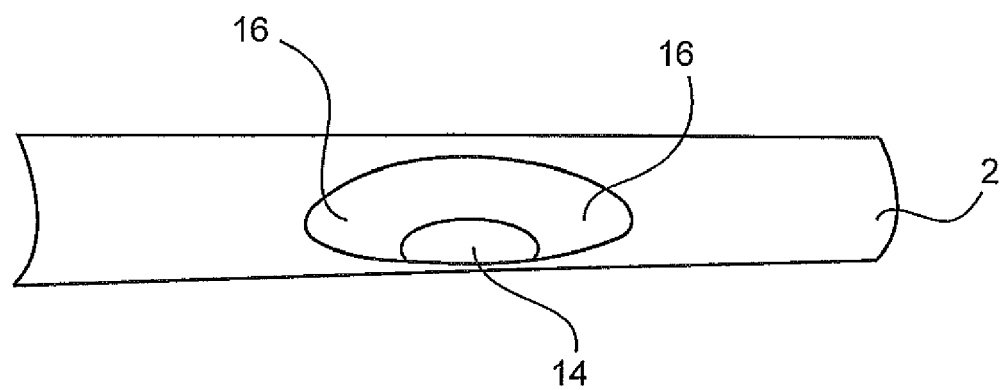

The following FIGS. 2a to 2c show the effect of an impact of a spherical body on the nose of the fairing according to the exemplary embodiment shown in FIG. 1. As shown in FIG. 2a, an impact of a spherical body 10 on the skin 2 of the fairing is shown. In particular, FIG. 2a shows that, although a spherical body 10 has impacted the nose, no rotationally symmetrical deformation of the skin and of the underlying support structure has been caused. The direction of impact of the body 10 is shown by arrow 12 in FIG. 2a.

Deformation is greatest in the region 14 of the immediate surrounding of the impacted body 10. However, as shown in FIG. 2a, deformation along the stringers 4 that are arranged underneath the skin 2 is distributed over a large area to the regions 16 that extend essentially along the nose direction.

The above is also shown in FIGS. 2b and 2c, which show a lateral view and a direct top view of the deformation. As shown in FIGS. 2a to 2c, essentially a lenticular deformation is achieved or a deformation which corresponds to a buckled circle. The deformation extends significantly further along the direction of deformation of the nose than it does in a direction at a right angle to it. In other words, when the fairing is a tail unit edge or a wing edge, deformation extends essentially along the tail unit edge or wing edge, rather than into the tail unit or into the wing.

Consequently the introduced kinetic energy that is predefined by the mass velocity of the impacted body is converted to forming-work of the material involved. Since according to the present invention the adjoining regions 16 are included in the deformation, the metal volume required for energy conversion is distributed over a larger surface so that a lesser wall thickness can be used, for example for the skin 2. As a result of the geometry of the nose parts, in an advantageous manner, for example in the case of a vertical tail, the regions above and below the impact point are available to this effect.

Figure 3:
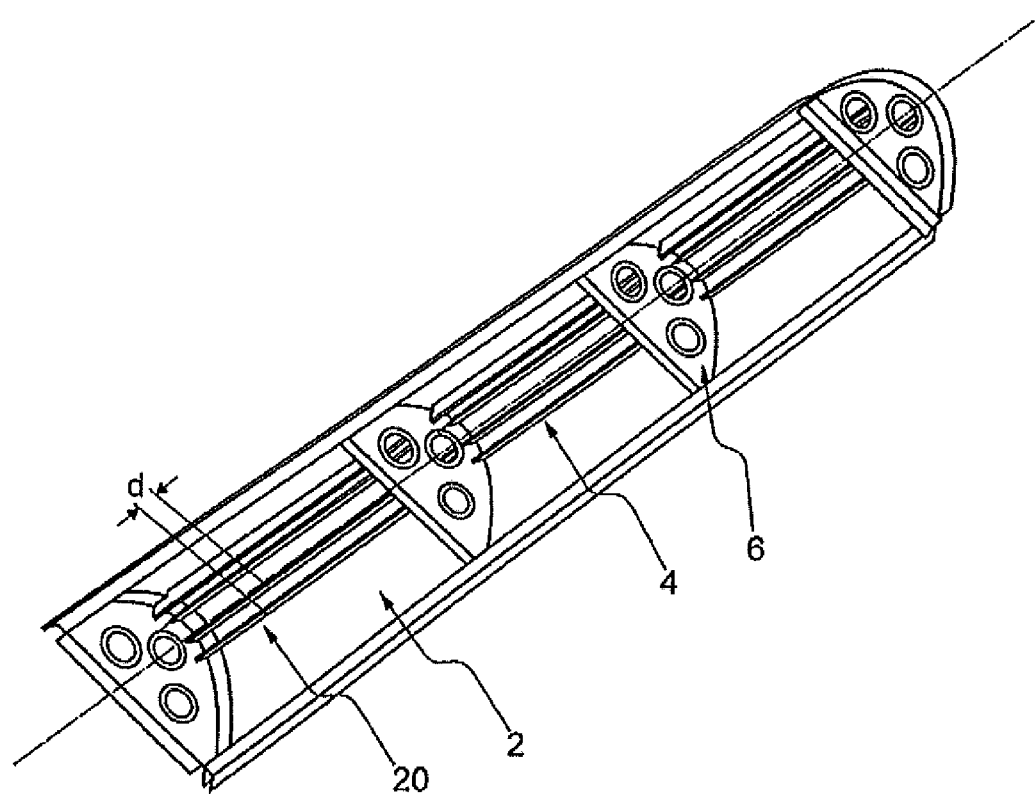
FIG. 3 shows a three-dimensional view of a further advantageous exemplary embodiment of the present invention.

FIG. 3 shows a further three-dimensional view of a further advantageous exemplary embodiment of the cover according to the present invention. As FIG. 3 shows, the deformation depth and the size of the deformation into adjacent regions 16 can be defined by dimensioning the stringers and by setting the spacing d between the stringers. It is possible to arrange the stringers with equidistant spacing. However, the frequency of stringers can be greater where less deformation depth is required. In FIG. 3 the stringers 4 are arranged essentially parallel in relation to each other in the direction of extension of the nose part.

The design of the cover shown in FIG. 3 essentially corresponds to that of the cover shown in FIG. 1. However, each of the stringers 4 is arranged on a thickened part 20 of the skin 2. In an advantageous manner, at contact points the thickened parts 20 of the stringers 4 are welded to the skin 2. In an advantageous manner this can be carried out by means of a laser welding process.

Figure 4:
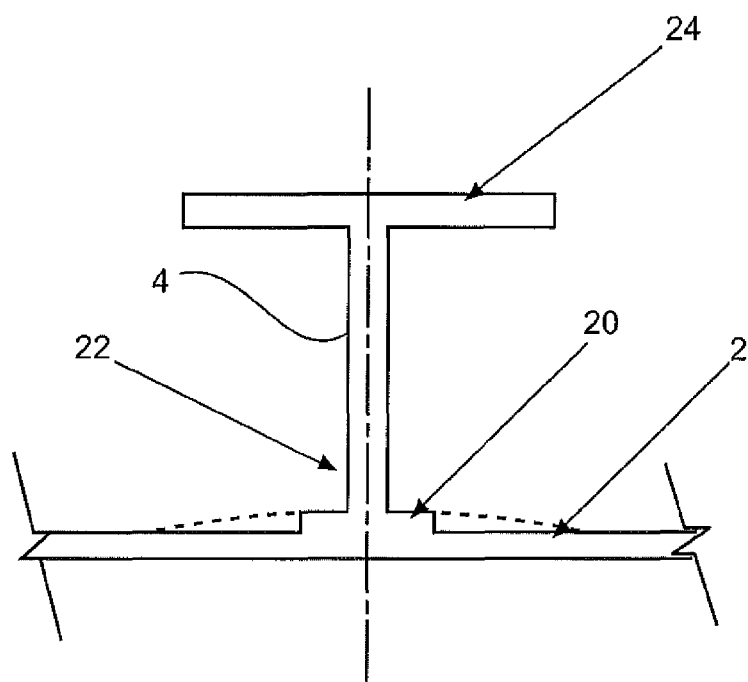
FIG. 4 shows a cross section of a stringer and its affixation to the skin according to an advantageous exemplary embodiment of the present invention.

FIG. 4 shows a section view of a stringer 4 of the skin 2 and of the thickened part 20 of FIG. 3.

As shown in FIG. 4, the stringer 4 is essentially T-, L-, Z-, U- or J-shaped, wherein a stringer base 22 is connected to a thickened part 20 in the skin 2. As shown in FIG. 4, the thickened part 20 in the skin 2, which can for example be made of aluminium sheeting, can merely be a rectangular thickened part in the regions of the stringer base 20. However, it is also possible to achieve continuous transitions between the thickened part and normal regions of the sheet metal, as is, for example, shown in FIG. 4 by means of the dashed line.

As shown in FIG. 4, the stringer 4 can also comprise a reinforcement 24 in the head region of the stringer 4, as a result of which the T-, L-, Z-, U- or J-shaped cross sectional structure can be achieved. This makes it possible to produce the stringer in a simple manner with light weight yet good stability.

Figure 5:
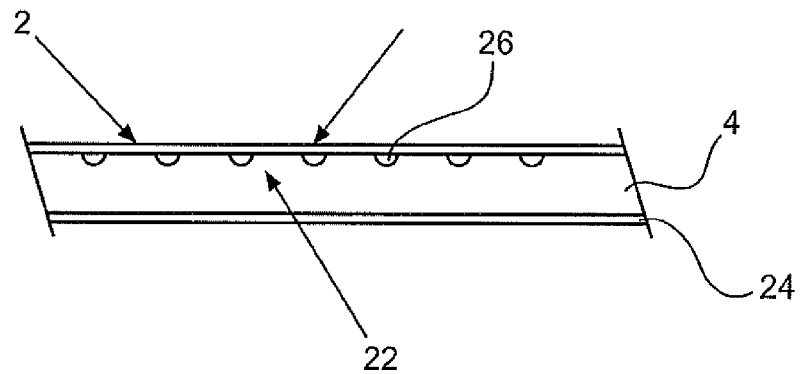
FIG. 5 shows a lateral view of a stringer according to a further advantageous exemplary embodiment of the present invention.

FIG. 5 shows a lateral view of an exemplary embodiment of a stringer according to the present invention. As shown in FIG. 5, the stringer base 22 comprises interruptions, recesses or cut-outs which, as shown in FIG. 5, can open towards the skin. In FIG. 5 these recesses are designated 26. These recesses 26 can be provided at any desired constant or varied frequency along the stringer base 22.

Figure 6:
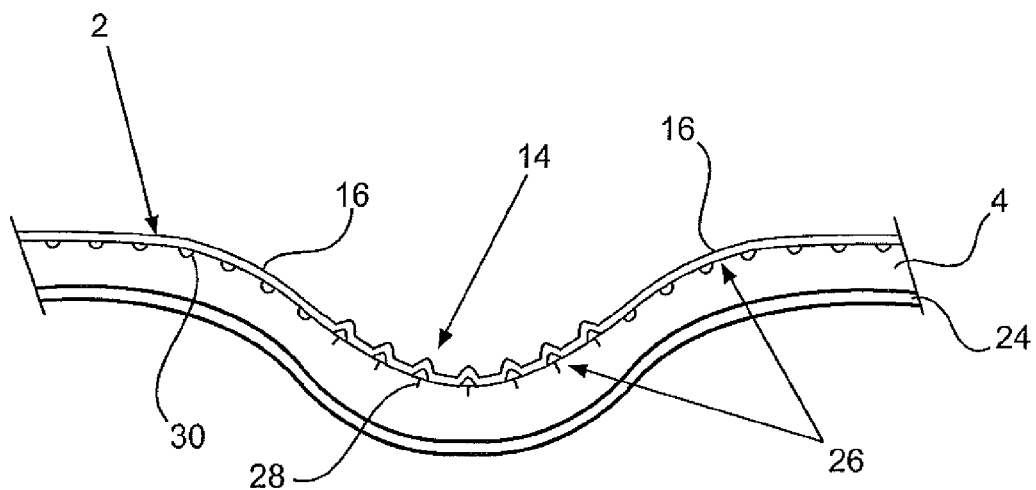
FIG. 6 shows the stringer of FIG. 5 in its deformed state.

FIG. 6 shows the effect of these recesses 26 during deformation of the stringer. As shown in FIG. 6, the recesses 28 are closed in regions in which the surface of the stringer 4 buckles, wherein in regions where expansion of the surface of the stringer base occurs recesses 40 are widened. In other words the recesses act as expansion compensation regions during deformation as a result of impact of an object on the skin, such that buckling or expansion can be compensated for by means of the recesses 26. Furthermore, it is possible by designing the recesses 26 to control the forces that occur during an impact in such a way that deformation can be controlled. Advantageously the recesses 26 can also be used to prevent cracks in expansion regions.

According to the present invention, a cover, for example for nose parts of the fairings, of vertical tail units and horizontal tail units as well as wings of an aircraft, is thus stated, in which cover stringers are provided that in the case of impact of an object plastically deform along considerable length and that absorb a large part of the introduced energy. In this manner it becomes possible for only a small part of the introduced plastic energy to be absorbed by the plastic deformation of the skin of the aircraft. As a result of the measures described above, the precise course of deformation can be set. This can, for example, be determined by means of crash simulations. In order to prevent deformation as a result of air loads, small crescent-shaped ribs can be provided at corresponding spacings. In particular, the present invention can make it possible to save weight and costs. Furthermore, improved deformation behaviour, for example in the case of a bird strike, can be made possible.

FIG. 7a depicts a part of a stringer 38 with a stringer base 40 adapted to contact the skin 42 of the cover according to the present invention. The stringer 40 comprises a weakened area 44 that is realized as a slot 46 with a root portion 48, wherein the slot 46 is of a longitudinal shape with substantially parallel edges and wherein the root portion 48 is of a substantially circular shape. In case an impact force acts on the skin 42 in the direction of the slot 46 lower corners 50 will start to move outwardly, thus leading to a hinge-like behaviour of the weakened area wherein the adjacent parts of the stringer 38 substantially remain undeformed, which behaviour leads to a controlled deformation of the skin 42. A deformation into a direction inside the cover is possible, wherein a deformation force into the other direction lead to the flanks of the slot 46 touching each other, thus avoiding a deformation into the outer direction.

As shown in FIG. 7b a stringer 51 may also have a weakened area 52 that comprises a trapezoidal cut-out 54 with a substantially straight root 56. Ends 58 of the cut-out 54 will move outwardly when an impact force acts upon the skin 42 in the direction of the weakened area 52.

Additionally, a stringer 60 may comprise a weakened area 62 with a cut-out 64 positioned inside the stringer 60 without reaching the stringer base 40 or the opposite side. The cut-out 64 therefore comprises a closed circumference. As an impact force acts upon the stringer 60 towards the weakened area 62 the material of the stringer 60 in a section 64 between the cut-out and the edge of the stringer 60 opposite to the base 40 will experience a tensile force that leads to crack or disruption of the stringer 60 that leads to a joint- or hinge-like behaviour of the stringer 60 and therefore leads to an improved spreading of the impact energy into the skin 42.

FIG. 8 shows an unwind of a cover according to the present invention. Here, sections 68 of stringers with intermediate weakened areas 70 are depicted that each are fastened to the skin 42. If an impact force acts upon the skin 42 in a direction towards the sections 68 of the stringers deformations of the skin 42 concentrate on these weakened areas 70. Therefore, the sections 68 remain substantially undeformed, wherein the weakened areas 70 act as deformation nodes. On displacing a single section 68 of a single stringer adjacent sections 68 of the same stringer are also displaced based on the tensile forces acting through the weakened areas 70. Additionally, sections 68 of adjacent stringers are also displaced since weakened areas 70 of adjacent stringers are interconnected through skin portions 72 that transfer tensile forces until the skin cracks. This effect is improved when the weakened areas 70 of adjacent stringers are longitudinally displaced.

Therefore, the cover according to the present invention may be interpreted as a series of link chains building a link "web" spreading impact energy through a large skin area leading to an improved absorption of impact energy.

Further, in FIG. 9 a cover according to the present invention with a plurality of stringers 74 attached to the skin 42, wherein the stringers 74 comprise weakened areas in form of slots 76 is shown. The slots 76 are longitudinally displaced for improving the impact energy spread.

By designing the cover according to the present invention as shown in this application a self-support may be realized that eliminates the need for intermediate ribs positioned between outer ribs inside a cover according to the present invention.

In FIG. 10 the deformation of the skin 42 on an impact is shown. A number of segments 68 move inside the cover, thereby pulling other adjacent segments 68 into the same direction and thereby deforming the skin 42. The skin 42 is becoming partially twisted and stretched and thereby absorbing impact energy efficiently. For clarity only one half is shown.

FIG. 11 shows an aircraft with a fairing according to an exemplary embodiment of the present invention. The aircraft shown in FIG. 7 comprises a vertical tail 36 as well as a horizontal tail 32 with the fairing according to the invention. Likewise, the wing noses 34 can be designed according to the fairing of the present invention.

In addition it should be pointed out that "comprising" does not exclude other elements or steps, and "a" or "one" does not exclude a plural number. Furthermore, it should be pointed out that characteristics or steps which have been described with reference to one of the above embodiments can also be used in combination with other characteristics or steps of other embodiments described above. Reference characters in the claims are not to be interpreted as limitations.

The invention claimed is:

1. A cover for an aircraft structure for nose parts of the vertical tail, horizontal tail or the wing, wherein the cover comprises:
    a skin;
    a support structure;
    wherein the skin is arranged on the support structure;
    wherein the support structure includes a plurality of ribs and a plurality of stringers;
    wherein the plurality of stringers are arranged on the plurality of ribs to support the skin; and
    wherein the plurality of stringers each comprise a multitude of weakened areas positioned opposite to a stringer base, which stringer base is adapted to support the skin.

2. The cover of claim 1,
    wherein the skin forms a curvature around the structure of the aircraft;
    wherein the form of the plurality of ribs is adapted at least to a cross section of the curvature; and wherein the plurality of stringers substantially extend parallel to each other on the plurality of ribs.

3. The cover of claim 1,
wherein a thickness and a material of the skin, first dimensions and a first distance of the plurality of stringers and second dimensions and a second distance of the plurality of ribs are adapted such that, when there is an impact of an object having third dimensions onto the skin, the energy introduced by the impact is distributed over a first region of the skin, the first region having fourth dimensions;
wherein the energy introduced by the impact is converted to forming-work of the skin, of the plurality of stringers, or of the plurality of ribs;
wherein an adjacent second region of the skin, onto which the energy introduced by the impact on the first region of the skin is further distributed to a certain extent for further converting the impact energy to forming-work has further dimensions;
wherein fifth dimensions of the second region are larger than the fourth dimensions of the first region.

4. The cover of claim 1,
wherein the cover forms a nose part of the vertical tail, horizontal tail or of wings of the aircraft;
wherein the nose part has an edge that extends substantially along one direction;
wherein the plurality of ribs are arranged substantially perpendicularly to this direction; and
wherein the plurality of stringers are arranged substantially parallel to this direction.

5. The cover of claim 1,
wherein the plurality of stringers are connected to the skin.

6. The cover of claim 5,
wherein in contact regions where the plurality of stringers touch the skin, the skin comprises thickened parts or regions.

7. The cover of claim 1,
wherein the plurality of stringers have at least one of a T-, L-, Z-, U- and J-shaped cross section.

8. The cover of claim 1,
wherein each of the plurality of stringers comprises a stringer base that is adapted for contacting the skin; and
wherein the stringer base has at least one recess.

9. The cover of claim 8,
wherein the at least one recess points towards the skin; and
wherein the at least one recess is adapted as an expansion compensation region and defined buckling region in the case of deformation that is caused by the object impacting the skin.

10. The cover of claim 1,
wherein the support structure and the skin are adapted for cooperation such that when a spherical body impacts the skin, the deformation of the skin caused by the impact of the spherical body does not have a rotationally symmetrical cross section.

11. The cover of claim 1,
wherein the weakened areas are recesses.

12. The cover of claim 1,
wherein the weakened areas are cut-outs with a closed circumference.

13. The cover of claim 1,
wherein weakened areas of adjacent stringers are displaced longitudinally relative to each other.

14. The cover of claim 1,
wherein the skin is made of sheet metal.

15. An aircraft with a cover, wherein the cover comprises:
a skin;
a support structure;
wherein the skin is arranged on the support structure;
wherein the support structure includes a plurality of ribs and a plurality of stringers;
wherein the plurality of stringers are arranged on the plurality of ribs to support the skin; and
wherein the plurality of stringers each comprise a multitude of weakened areas positioned opposite to a stringer base, which stringer base is adapted to support the skin.

* * * * *